United States Patent
Chen

(10) Patent No.: US 11,407,894 B2
(45) Date of Patent: Aug. 9, 2022

(54) POLYMER COMPOSITIONS HAVING UNIQUE DIFFERENTIAL SCANNING CALORIMETRY (DSC) AND DSC CRYSATILLIZATION EXOTHERM (TPC) CHARACTERISTICS, METHOD FOR PREPARING SAID COMPOSITION, ARTICLE COMPRISING SAID COMPOSITION AND METHOD PREPARING SAID ARTICLES

(71) Applicant: QUINLYTE HOLDING B.V., Sittard (NL)

(72) Inventor: Hao Chen, Sittard (NL)

(73) Assignee: QUINLYTE HOLDING B.V., Sittard (NL)

(*) Notice: Subject to any disclaimer, the term of this patent is extended or adjusted under 35 U.S.C. 154(b) by 25 days.

(21) Appl. No.: 16/718,944

(22) Filed: Dec. 18, 2019

(65) Prior Publication Data
US 2020/0199361 A1    Jun. 25, 2020

(30) Foreign Application Priority Data
Dec. 18, 2018   (NL) .................................... 2022244

(51) Int. Cl.
| | | |
|---|---|---|
| C08L 77/02 | (2006.01) | |
| C08L 23/12 | (2006.01) | |
| C08L 29/04 | (2006.01) | |
| C08J 3/00 | (2006.01) | |
| C08L 77/00 | (2006.01) | |
| B33Y 10/00 | (2015.01) | |
| B33Y 70/00 | (2020.01) | |
| D01F 6/46 | (2006.01) | |
| C08L 23/08 | (2006.01) | |

(52) U.S. Cl.
CPC .............. *C08L 77/02* (2013.01); *C08J 3/005* (2013.01); *C08L 23/12* (2013.01); *C08L 77/00* (2013.01); *B33Y 10/00* (2014.12); *B33Y 70/00* (2014.12); *C08J 2377/02* (2013.01); *C08J 2423/12* (2013.01); *C08J 2423/14* (2013.01); *C08J 2429/04* (2013.01); *C08J 2451/06* (2013.01); *C08L 23/0861* (2013.01); *C08L 2205/035* (2013.01); *D01F 6/46* (2013.01)

(58) Field of Classification Search
None
See application file for complete search history.

(56) References Cited

U.S. PATENT DOCUMENTS

| | | | | |
|---|---|---|---|---|
| 5,162,422 A | * | 11/1992 | Lausberg | C08K 5/09 524/504 |
| 5,342,886 A | | 8/1994 | Glotin et al. | |
| 6,649,103 B1 | | 11/2003 | Bousmina et al. | |
| 2005/0222327 A1 | | 10/2005 | Botros et al. | |
| 2006/0148987 A1 | * | 7/2006 | Schauder | C08L 23/12 525/178 |
| 2011/0020651 A1 | * | 1/2011 | Jang | C08L 77/00 428/413 |
| 2014/0039120 A1 | * | 2/2014 | Ieda | C08L 77/06 524/606 |
| 2014/0107273 A1 | * | 4/2014 | Ochiai | C08L 77/02 524/451 |
| 2015/0087752 A1 | | 3/2015 | Dinunzio | |
| 2020/0002483 A1 | * | 1/2020 | Sinha | C08K 7/04 |

FOREIGN PATENT DOCUMENTS

| | | | |
|---|---|---|---|
| CA | 2307083 A1 | | 4/1999 |
| CN | 107973985 | * | 5/2018 |
| EP | 235876 | * | 9/1987 |
| EP | 1095075 B1 | | 1/2008 |
| FR | 2955585 | * | 7/2011 |
| JP | 61028539 | * | 2/1986 |
| WO | 2008/019515 A1 | | 2/2008 |
| WO | 2013/150357 A1 | | 10/2013 |

OTHER PUBLICATIONS

AdvanSix Product Specification for Aegis H120MP; (2016) pp. 1-2. (Year: 2016).*
NL2022244 Examination Report.
EP19217280 European Search Report.

* cited by examiner

*Primary Examiner* — David J Buttner
(74) *Attorney, Agent, or Firm* — Shumaker, Loop & Kendrick, LLP

(57) ABSTRACT

The present invention relates to a polymer composition comprising between 30 and 45 wt. % of polyamides and/or ethylene vinyl alcohols and between 70 and 50 wt. % of polypropylenes, based on the combined weight of polyamides and/or ethylene vinyl alcohols and polypropylenes; wherein the polypropylene forms a first phase having a first melting endotherm in differential scanning calorimetry and wherein the polyamides and/or ethylene vinyl alcohols form a second phase having a second melting endotherm in differential scanning calorimetry; wherein the tallest differential scanning calorimetry exothermic crystallisation peak ($T_{pc}$) has an area under the curve of at least 80% of the total area under the curve between a temperature of 200 and 50° C.; wherein the temperature of the tallest differential scanning calorimetry exothermic crystallisation peak ($T_{pc}$) is between 85° C. and 110° C.

14 Claims, No Drawings

US 11,407,894 B2

POLYMER COMPOSITIONS HAVING UNIQUE DIFFERENTIAL SCANNING CALORIMETRY (DSC) AND DSC CRYSATILLIZATION EXOTHERM (TPC) CHARACTERISTICS, METHOD FOR PREPARING SAID COMPOSITION, ARTICLE COMPRISING SAID COMPOSITION AND METHOD PREPARING SAID ARTICLES

TECHNICAL FIELD

The present invention relates to a polymer composition comprising polyamides and/or ethylene vinyl alcohols and polypropylenes having certain thermal characteristics. In addition, the invention relates to methods of preparing said composition from virgin polymers or from recycled polymer articles. Moreover, the invention relates to an article and a method of preparing said article.

BACKGROUND

Use-and-Dispose is the current consumption model of most plastics. It is, however, not sustainable and considered by many as no longer acceptable. Managing plastic waste is costly. If not managed properly, it becomes a serious pollution to our living environment. Therefore, the market is calling for a Use-Recycle-and-Reuse model for the future use of plastics.

It is not an easy switch to recycling and reusing plastics either by a chemical or mechanical recycling method. Chemically recycled plastics have a performance close to that of virgin polymers, but the costs are still very high and often considered too high for many applications. Moreover, in many cases, chemical recycling according to current technologies has an even higher carbon footprint than making virgin polymers directly from fossil building blocks. Currently mechanically recycled plastics, although being more cost attractive than chemically recycled plastics and having a significantly lower carbon footprint, have significantly lower performance and are only suitable for low-end applications. Thus many difficulties are present preventing an easy switch to recycling and reusing of plastics on large scale.

Multiple-material plastic articles (articles that are made from mixtures/blends of plastics) are perceived in general as one of the biggest problems for mechanical recycling. Recycled plastics with immiscible blends have poor performance. In addition, it is almost impossible to mechanically separate different plastics from a single plastic article for recycling. However, in many disposables (e.g. packaging) and in durable use of plastics, multilayer films (different material films) and polymer blends are indispensable due to performance requirements. These seemingly irreconcilable requirements provides a serious challenge in the field of plastics recycling.

The relatively simple material sorting and processing that are used during mechanical recycling of plastics impose limited options for mechanically recycled plastics, making. It difficult to tailor-make mechanically recycled plastics for the processing needs of a specific plastic application, which is often the case for virgin materials.

Furthermore, it is commonly known that plastics will degrade during each recycling (melting) cycle. So even if the first above mentioned problems would be overcome, mechanically recycled plastics would still intrinsically perform worse than virgin materials. This mechanical degradation will increase with each recycling cycle.

To make mechanical recycling a viable solution for the Use-Recycle-and-Reuse circular model, there is a need for a multi-material plastic that can be recycled without separating the multiple materials during mechanical recycling. In addition, there is a need for a multi-material plastic that has a wide processing window making it suitable for a broad range of applications. Moreover, there is a need for a multi-material plastic with minimized degradation even after multiple cycles of mechanical recycling.

SUMMARY

It is an object of the present invention to provide an improved polymer composition comprising at least two types of polymers thereby making it a multi-material plastic. It is a further object of the present invention to a method of preparing the composition. Corresponding embodiments are also applicable for a method of preparing this composition, an article comprising this composition, and a method to prepare this article. It is a further object of the present invention to provide an article comprising the improved polymer composition. It is a further object of the present invention to provide a method to prepare the article.

In a first aspect, the present invention relates to a polymer composition as recited in claim 1. In a second aspect, the present invention relates to a method of preparing the composition as recited in claims 12 and 13. In a third aspect, the invention relates to an article comprising said composition, as recited in claim 14. In a fourth aspect, the invention relates to a method of preparing an article as recited in claim 15.

The polymer composition (also called alloy, polymer alloy or plastic alloy; or blend, plastic blend or polymer blend) according to the present invention can be made either from virgin polymers or from plastic wastes.

The present inventor has observed that polymer alloys of polypropylene (first phase/matrix phase) and polyamide and/or ethylene vinyl alcohol (second phase/dispersed phase) provide the required properties. These materials were surprisingly found to display a delayed crystallization. It also combines the excellent properties of both phases, being a high tensile modulus, good impact resistance properties, good heat resistance and good barrier properties of the second phase (polyamide (PA) and/or ethylene vinyl alcohol (EvOH)) with the low cost, high processability and high water/chemical resistance of the first phase (polypropylene(s)). Moreover, the compositions according to the invention are found to keep excellent properties even after recurred mechanical recycling.

LIST OF DEFINITIONS

The following definitions are used in the present description and claims to define the stated subject matter. Other terms not cited below are meant to have the generally accepted meaning in the field.

Virgin polymer as used in the present description means a polymer that is obtained by polymer manufacturing and has not been used in an application before or that has not been processed before.

Recycled polymer as used in the present description means a polymer that is obtained from recycling of a polymer article, viz. a polymer that has been used in an application before or that has been processed before.

Polymer alloy or alloy as used in the present description means a material that is analogous to metal alloys, wherein at least two different macromolecular substances (viz. polymers or copolymers) are blended, not including polymer additives. (Polymer) alloy according to the present description specifically refers to an immiscible but compatible blend exhibiting at least two phases. Preferably, the phases are mixed to such an extent that the inhomogeneity caused by different phases is on a small enough scale not to be apparent in use.

Polypropylene(s) as used in the present description means polypropylene homopolymers and/or copolymers. Suitable examples are homopolymers, block and random copolymers, polypropylene (copolymer)-based tie resins, and polypropylene based elastomers.

Polyamide(s) as used in the present description means polyamide polymers and/or copolymers. Suitable examples are aliphatic polyamide homopolymers, copolymers of aliphatic polyamide, semi-aromatic and aromatic polyamide homopolymers and copolymers.

Ethyl vinyl alcohol(s) as used in the present description means ethyl vinyl alcohol copolymers. Suitable examples are EvOH with 20 mol. % 50 mol. % ethylene content.

Ternary polymer composition as used in the present description means a composition comprising at least three different (co)polymers, for example one polypropylene, one polyamide and one ethylene vinyl alcohol, or two polypropylenes and one polyamide or two polypropylenes and one ethylene vinyl alcohol.

Quaternary polymer composition as used in the present description means a composition comprising at least four different (co)polymers, for example two polypropylene(s), one polyamide and one ethylene vinyl alcohol, or three polypropylenes and one polyamide or three polypropylenes and one ethylene vinyl alcohol.

Quinary or pentanary polymer composition as used in the present description means a composition comprising at least five different (co)polymers, for example three polypropylene, one polyamide and one ethylene vinyl alcohol, or four polypropylenes and one polyamide or four polypropylenes and one ethylene vinyl alcohol.

Multi-material plastic as used in the present description means a plastic material that is made up of at least two different macromolecular substances (viz. polymers or copolymers).

Melting endotherm as used in the present description means a phase transition from solid to liquid in the differential scanning calorimetry (DSC). Since a sample absorbs heat during melting, it is an endothermic process. Here, it specifically refers to the melting endotherm in the second heating scan.

Crystallization exotherm as used in the present description means a transition from an amorphous form to a crystalline form in the differential scanning calorimetry. Since the sample releases heat during crystallization, it is an exothermic process. Here, it specifically refers to the crystallization exotherm in the cooling scan.

Peak temperature as used in the present description means the temperature of i) peak absorption of heat (endothermic) ($T_m$ in general; or $T_{m1}$ for first phase melting endotherm in the second heating scan of polymer alloy) or ii) peak release of heat (exothermic) ($T_{pc}$) by the sample in differential scanning calorimetry. The processing window of the samples are indicated by the $T_{pc}$ and by the $T_{m1}-T_{pc}$.

Delayed crystallization as used in the present description means that the crystallization of the polymer in the cooling scan is delayed, which can be defined by a low value for $T_{pc}$ and a high value for $T_{m1}-T_{pc}$. Delayed crystallization is desired for a plastic particle extrusion process, since it will lead to a broader processing window.

Isothermal DSC measurement as used in the present description means a specific differential scanning calorimetry for studying the two-step kinetic processes associated with polymer crystallization from the melt (the cooling scan). The first of these processes is the formation of nucleation sites, and the second is the polymer crystallization at those sites. Isothermal crystallization measurements are used in quality control to follow lot-to-lot variations in product and in research to predict product performance or process improvements.

Peak heat flow in the present description means the heat flow at the peak of the crystallization exotherm in an isothermal DSC measurement. Heat flow is the amount of heat supplied per unit time. The unit for the heat is mw/mg and the unit for time is a thousandth of one minute.

Time to peak crystallization exotherm in the present description means the time from the moment that the targeted isothermal temperature is reached to the time that it reaches the peak crystallization exotherm. This is also referred to as the time needed to reach 50% crystallization and is denoted as $T_{0.5}$; the unit is minutes.

Ziegler-Natta catalyst as used in the present description means: a transition metal-containing solid catalyst compound. Ziegler-Natta catalysts are mixtures of metal (often Ti, Zr or Hf) halides—often on a solid support—and aluminum alkyl halide co-catalysts. These ZN catalyst are coordination complexes with multiple active sites. The exact catalyst structure is not known. Ziegler-Natta catalysed isotactic polypropylenes have a stereo-block distribution of stereo-defects, in which the polymer chains comprise highly isotactic segments (chains) and defect-rich segments (chains).

Metallocene catalyst as used in the present description means: a compound in which a transition metal is typically bridged/sandwiched between two cyclopentadienyl anion rings. Bridged metallocenes have well defined chemical structures that can be isolated and determined by x-ray crystallography. These structures have a single active polymerization site with uniform ligand environment that can better control the architecture of chains. Metallocene catalysed isotactic polypropylenes typically have a random distribution of stereo-defects, with isotactic and less isotactic blocks within a chain.

DESCRIPTION OF EMBODIMENTS

The present inventor has found that a certain weight range (concentration range) of the second phase (PA and/or EvOH) compared to the first phase (polypropylene(s)) is required for good mechanical, thermal and barrier properties.

Without wishing to be bound to a particular theory, the inventor believes that the claimed range also allows the alloy to further delay the crystallization when cooling down from the melt phase and to reach an equilibrium state between molecule chain cession, entangling and forming new covalent bonds during mechanical recycling.

The addition of higher amount of compatibilizers, for example highly concentrated acid anhydride grafted polypropylenes might improve the miscibility of the dispersed phase. However, the present inventor has observed that such improvement soon became marginal despite the significant increase of anhydride content. Because the fraction of unreacted anhydride groups increased significantly, which also jeopardized the mechanical, thermal, barrier performance and food safety of the material.

Such challenges have significantly limited the application possibilities of this type of alloy up to now; this has been solved by the present invention by a specific alloy having specific thermal properties.

In a first aspect, the invention relates to a polymer composition comprising between 30 and 50 wt. % of polyamides and/or ethylene vinyl alcohols, and between 70 and 50 wt. % of polypropylenes, based on the combined weight of polyamides and/or ethylene vinyl alcohols and polypropylenes;
- wherein the polypropylene forms a first phase (matrix phase) having a first melting endotherm (m1) in differential scanning calorimetry (DSC)—preferably measured at a heating rate of 20 Kelvin (K)/minute— and wherein the polyamides and/or ethylene vinyl alcohols form a second phase (dispersed phase) having a second melting endotherm in DSC—preferably measured at a heating rate of 20 K/minute—, wherein the temperature of the first melting endotherm is lower than the temperature of the second temperature melting endotherm;
- wherein the tallest DSC crystallization exotherm has an area under the curve of at least 80% of the total area under the curve between a temperature of 200° C. and 50° C.;
- wherein the peak temperature of the tallest DSC crystallisation exotherm ($T_{pc}$) measured at a cooling rate of 20 K/minute is between 85° C. and 110° C.;
- wherein the temperature difference ($T_{m1}-T_{pc}$) between the peak temperature in DSC of the first melting endotherm ($T_{m1}$) measured at a heating rate of 20 K/minute and the peak temperature of the tallest DSC crystallisation exotherm ($T_{pc}$) of the first phase measured at 20 K/minutes is at least 45° C.

The publication Sierra, J. D. et al, "Isothermal and non-isothermal crystallization kinetics for blends of polyamide 6 and polypropylene", Zeitschrift Kunststofftechnik/ Journal of Plastics Technology, 2006 reports the investigation of the isothermal and non-isothermal crystallization kinetics of blends of polypropylene and polyamide 6.

In an embodiment, the polymer composition comprising between 30 and 50 wt. % of polyamides and optionally ethylene vinyl alcohols.

In an embodiment, the composition comprises at least 75 wt. % polyamide, preferably at least 80 wt. % polyamide, preferably at least 90 wt. % polyamide, more preferably 100 wt. % polyamide, based on the combined weight of polyamides and/or ethylene vinyl alcohols. In an embodiment, the composition comprises less than 5 wt. % ethylene vinyl alcohol, preferably less than 1 wt. % ethylene vinyl alcohol, such as less than 0.5 wt. % ethylene vinyl alcohol based on the combined weight of polyamides and/or ethylene vinyl alcohol. In an embodiment, the present polymer composition comprises no ethylene vinyl alcohol. When recycling multiple times, ethylene vinyl alcohol may degrade so for certain applications it may be desirable to limit to amount ethylene vinyl alcohol or to restrain from using it completely.

In an embodiment, the composition comprises at least 70 wt. % ethylene vinyl alcohol, preferably at least 80 wt. % ethylene vinyl alcohol, more preferably at least 90 wt. % ethylene vinyl alcohol, based on the combined weight of polyamides and/or ethylene vinyl alcohols. In an embodiment, the composition comprises less than 5 wt. % polyamide, preferably less than 1 wt. % polyamide, such as less than 0.5 wt. % polyamide based on the combined weight of polyamides and/or ethylene vinyl alcohol. In an embodiment, the present polymer composition comprises no polyamide. When high oxygen barrier and high tensile modulus is required, it is preferred that little or no polyamide is present.

In an embodiment, the composition comprises at least 35 wt. % of polyamides and/or ethylene vinyl alcohols, based on the combined weight of polyamides and/or ethylene vinyl alcohols and polypropylenes and the composition comprises at most 65 wt. % of polypropylenes based on the combined weight of polyamides and/or ethylene vinyl alcohols and polypropylenes.

In an embodiment, the composition comprises at least 35 wt. % of polyamides based on the combined weight of polyamides, and polypropylenes. In an embodiment, the composition comprises at most 45 wt. % of polyamides, based on the combined weight of polyamides and polypropylenes. In an embodiment, the composition comprises at most 65 wt. % of polypropylenes, based on the combined weight of polyamides and polypropylenes. In an embodiment, the composition comprises at least 55 wt. % of polypropylenes, based on the combined weight of polyamides and polypropylenes. In a specific embodiment, the composition comprises between 35 and 45 wt. % of polyamides and between 65 and 55 wt. % of polypropylenes, based on the combined weight of polyamides and polypropylenes.

It is desirable that the amount of polypropylenes is above 50 wt. % to ensure that polypropylenes are the continuous (matrix) phase.

In a specific embodiment, in the polymer composition comprising polyamides and polypropylenes, the polypropylenes comprise between 25 and 50 wt. % of at least one polypropylene homopolymer, between 25 and 65 wt. % of at least one polypropylene copolymer, and between 3 and 45 wt. % of at least one anhydride-grafted polypropylene based on the weight of the polypropylenes. Preferably said at least one polypropylene homopolymer, said at least one polypropylene copolymer and said at least one anhydride-grafted polypropylene combined form 100 wt. % of said polypropylenes. In this specific embodiment, said polymer composition comprises at least three types of polypropylenes and at least one type of polyamide, being at least a quaternary composition.

In a specific embodiment, in the polymer composition comprising polyamides and polypropylenes, the polypropylenes comprise between 55 and 70 wt. % of at least one polypropylene homopolymer and between 3 and 45 wt. % of at least one anhydride-grafted polypropylene based on the weight of the polypropylenes, preferably said at least one polypropylene homopolymer and said at least one anhydride-grafted polypropylene combined forming 100 wt. % of said polypropylenes. In this specific embodiment, said polymer composition comprises at least two types of polypropylenes and at least one type of polyamide, being at least a ternary composition.

In an embodiment, the composition comprises between 30 and 40 wt. % of ethylene vinyl alcohols and between 70 and 60 wt. % of polypropylenes, based on the combined weight of ethylene vinyl alcohols and polypropylenes. In an embodiment, the composition comprises between 30 and 35 wt. % of ethylene vinyl alcohols and between 65 and 70 wt.

% of polypropylenes, based on the combined weight of ethylene vinyl alcohols and polypropylenes.

In a specific embodiment, in the polymer composition comprising ethylene vinyl alcohols and polypropylenes, the polypropylenes comprise between 25 and 50 wt. % of at least one polypropylene homopolymer, between 25 and 65 wt. % of at least one polypropylene copolymer, and between 3 and 45 wt. % of at least one anhydride-grafted polypropylene based on the weight of the polypropylenes. Preferably said at least one polypropylene homopolymer, said at least one polypropylene copolymer and said at least one anhydride-grafted polypropylene combined form 100 wt. % of said polypropylenes. In this specific embodiment, said polymer composition comprises at least three types of polypropylenes and at least one type of ethylene vinyl alcohol, being at least a quaternary composition.

In a specific embodiment, in the polymer composition comprising ethylene vinyl alcohols and polypropylenes, the polypropylenes comprise between 55 and 70 wt. % of at least one polypropylene homopolymer and between 3 and 45 wt. % of at least one anhydride-grafted polypropylene based on the weight of the polypropylenes, preferably said at least one polypropylene homopolymer and said at least one anhydride-grafted polypropylene combined forming 100 wt. % of said polypropylenes. In this specific embodiment, said polymer composition comprises at least three types of polypropylenes and at least one type of ethylene vinyl alcohol, being at least a ternary composition.

In an embodiment, the composition comprises between 30 and 50 wt. % of polyamides and ethylene vinyl alcohols and between 70 and 50 wt. % of polypropylenes, based on the combined weight of polyamides, ethylene vinyl alcohols and polypropylenes. In an embodiment, the composition comprises between 35 and 45 wt. % of polyamides and ethylene vinyl alcohols and between 65 and 55 wt. % of polypropylenes, based on the combined weight of polyamides, ethylene vinyl alcohols and polypropylenes.

In a specific embodiment, in the polymer composition comprising polyamides, ethylene vinyl alcohols and polypropylenes, the polypropylenes comprise between 25 and 50 wt. % of at least one polypropylene homopolymer, between 25 and 65 wt. % of at least one polypropylene copolymer, and between 3 and 45 wt. % of at least one anhydride-grafted polypropylene based on the weight of the polypropylenes, preferably said at least one polypropylene homopolymer, said at least one polypropylene copolymer and said at least one anhydride-grafted polypropylene combined forming 100 wt. % of said polypropylenes; and wherein preferably the polyamides comprise between 60 and 85 wt. % and said ethylene vinyl alcohols comprise between 15 and 40 wt. % of the combined weight of said polyamides and said ethylene vinyl alcohols, more preferably said polyamides and said ethylene vinyl alcohols forming 100 wt. % of said combined weight of polyamides and ethylene vinyl alcohols. In this specific embodiment, said polymer composition comprises at least three types of polypropylenes, at least one type of ethylene vinyl alcohol and at least one type of polyamide, being at least a quinary composition.

In a specific embodiment, in the polymer composition comprising polyamides, ethylene vinyl alcohols and polypropylenes, the polypropylenes comprise between 55 and 70 wt. % of at least one polypropylene homopolymer and between 3 and 45 wt. % of at least one anhydride-grafted polypropylene based on the weight of the polypropylenes, preferably said at least one polypropylene homopolymer and said at least one anhydride-grafted polypropylene combined forming 100 wt. % of said polypropylenes; and wherein preferably the polyamides comprise between 60 and 85 wt. % and said ethylene vinyl alcohols comprise between 15 and 40 wt. % of the combined weight of said polyamides and said ethylene vinyl alcohols, more preferably said polyamides and said ethylene vinyl alcohols forming 100 wt. % of said combined weight of polyamides and ethylene vinyl alcohols. In this specific embodiment, said polymer composition comprises at least two types of polypropylenes, at least one type of ethylene vinyl alcohol and at least one type of polyamide, being at least a quaternary composition.

Suitable polypropylenes are i) homopolymers, such as isotactic polypropylene (PP-it), atactic polypropylene (PP-at); syndiotactic polypropylene (PP-st); ii) block and random copolymers, such as polypropylene/polyethylene copolymers, and iii) PP or PP copolymer based tie resins such as anhydride grafted polypropylene (PP-g-MA), and bio-based polypropylenes. The polypropylenes that are used in the present composition may be Ziegler-Natter catalysed or metallocene catalysed. The polypropylenes that are used in the present composition are preferably polypropylenes that are suitable for cast and/or blown film and or biaxially oriented film productions. In an embodiment, the propylene is a Ziegler-Natta catalysed propylene. In another embodiment, the propylene is a metallocene catalysed propylene.

Suitable polyamides are i) aliphatic polyamide homopolymers, such as PA-6, PA-6,6, PA-4,6, PA-4,10, PA-6,10, PA-10,10, PA-6,12, PA-12; ii) copolymers of aliphatic polyamide, such as PA-6/6,6, PA6,6/6 and PA6/12; iii) semi-aromatic and aromatic polyamide homopolymers and copolymers, such as but not limited to PA-6T, PA-6I,6T, PA6/6T, PA-MXD6. PA-6 as used in the present description is also known is polycaprolactam, polyamide 6, or Nylon-6, or by its IUPAC name poly(haxano-6-lactam). Nylon 6 is not a condensation polymer, but instead is formed by ring-opening polymerization. The polyamides that are used in the present composition are preferably polyamides that are suitable for cast and/or blown film productions.

In an embodiment, the polyamide (preferably being polyamide 6) has a relative solvent viscosity (RSV) of at least 3.0 measured in 90% formic acid. In a preferred embodiment, the RSV of the polyamide (e.g. 6) is between 3.2 and 3.6. In a preferred embodiment a medium RSV polyamide is used, having a RSV below 3.0 (e.g. between 2.0 and less than 3.0). In a preferred embodiment a high RSV polyamide is used, having a RSV of equal to or higher than 3.0 (e.g. between 3.0 and 4.0).

The relative solvent viscosity (RSV) of PA(6) is measured using the method similar to ISO3104, 3105. In this method the polymer to be tested is dissolved at 25° C. in 90% formic acid to form a solution with the polymer concentration of 1 gr/100 ml. The solution is introduced into the reservoir of a Ubbelohde Viscometer, then sucked through the capillary and measuring bulb. ISO 3105:1994 describes the specifications and operating instructions for glass capillary kinematic viscometers. Afterwards, the solution is allowed to travel back through the measuring bulb and the time it takes for the solution to pass through two calibrated marks is a measure for viscosity. The same procedure is applied to the solvent (here 90% formic acid) itself. The RSV is calculated as:

$$RSV = \frac{\text{Time polymer solution}}{\text{Time solvent}}$$

Suitable ethylene vinyl alcohols (EvOH) are EvOH with 20 mol. % 50 mol. % ethylene content. The ethylene vinyl alcohols that are used in the present composition are preferably ethylene vinyl alcohols that are suitable for cast and/or blown film productions.

In an embodiment of the invention, the polymer composition has a peak heat flow of the isothermal DSC crystallisation exotherm at a temperature of 124° C. is lower than 0.8 mW/mg, more preferably lower than 0.5 mW/mg. In this embodiment, the isothermal DSC polymer sample was cooled at a cooling rate of 65 K/minute to reach a temperature of 124° C. for the formation of nucleation sites, then crystallization at these sites.

In an embodiment of the invention, the polymer composition has a peak heat flow of the isothermal DSC crystallisation exotherm at a temperature of 122° C. is lower than 0.8 mW/mg, more preferably lower than 0.5 mW/mg. In this embodiment, the isothermal DSC polymer sample was cooled at a cooling rate of 65 K/minute to reach a temperature of 122° C. for the formation of nucleation sites, then crystallization at these sites.

In an embodiment of the invention, the composition has a peak heat flow of the isothermal DSC crystallisation exotherm with a cooling rate of 65 Kelvin/minute at a temperature of 120° C. is lower than 1.0 mW/mg, preferably lower than 0.8 mW/mg, more preferably lower than 0.5 mW/mg. In this embodiment, the isothermal DSC polymer sample was cooled at a cooling rate of 65 K/minute to reach a temperature of 120° C. for the formation of nucleation sites, then crystallization at these sites.

In an embodiment of the invention, the composition has a peak heat flow of the isothermal DSC crystallisation exotherm at a temperature of 118° C. is lower than 1.0 mW/mg, preferably lower than 0.8 mW/mg. In this embodiment, the isothermal DSC polymer sample was cooled at a cooling rate of 65 K/minute to reach a temperature of 118° C. for the formation of nucleation sites, then crystallization at these sites.

In an embodiment, the difference between $T_{m1}$ and $T_{pc}$ is at least 45° C., preferably at least 47° C., for example at least 49° C. or at least 50° C. In this embodiment, the $T_{m1}$ is determined by the second heating scan of the differential scanning calorimetry at a heating rate of 20 K/minute and $T_{pc}$ is determined by the cooling scan of the differential scanning calorimetry at the cooling rate of 20 K/minute. In an embodiment, the $T_{m1}$ is at most 165° C., preferably at most 162° C. for example at most 158° C. In this embodiment, the $T_{m1}$ is determined by the second heating scan of the differential scanning calorimetry at a heating rate of 20 K/minute. In an embodiment, the $T_{pc}$ is between 90° C. and 110° C., preferably between 90° C. and 108° C., more preferably between 95° C. and 108° C., for example between 95° C. and 106° C. In this embodiment, $T_{pc}$ is determined by the cooling scan of the differential scanning calorimetry at the cooling rate of 20 K/minute.

When more than one polypropylene is used, after the polypropylenes have been blended the different polypropylenes, such as homopolymer or copolymer cannot be separately detected. However, the polypropylene comprise propylene-based units (C3) (homopolymer and copolymer and anhydride-grafted polymer), ethylene-based units (C2) (copolymer and optionally anhydride grafted polymer), and anhydride (anhydride-grafted polymer). In an embodiment, the polypropylenes comprise between 84.20 wt. % and 99.96 wt. % of propylene-based units (C3), preferably between 94.30 wt. % and 99.1 wt. % or between 94.80 wt. % and 99.1 wt. %, based on the combined weight of the polypropylenes.

In an embodiment, the polypropylenes comprise between 0.00 wt. % and 15.00 wt. %, preferably between 0.5 wt. % and 5.50 wt. % or between 0.5 wt. % and 5.00 wt. %, of ethylene-based units (C2) based on the combined weight of the polypropylenes.

In an embodiment, the polypropylenes comprise between 0 wt. % and 95 wt. %, preferably between 15 wt. % and 75 wt. % or between 15 wt. % and 55 wt. % of at least one polypropylene homopolymer based on the combined weight of the polypropylenes.

In an embodiment, the polypropylenes comprise between 0 wt. % and 95 wt. %, preferably at least 20 wt. %, of at least one polypropylene copolymer, preferably without anhydride grafting, based on the combined weight of the polypropylenes. The polypropylene copolymer can be a random copolymer or an impact copolymer or both. In a specific embodiment, this polypropylene copolymer comprises 1-15 wt. % C2 (ethylene-based units). In a specific embodiment, the random polypropylene copolymer comprises 1-8 wt. % C2 (ethylene-based units), preferably between 1.5 and 5.5 wt. % C2 (ethylene-based units). In a specific embodiment, the impact polypropylene copolymer comprises 1-15 wt. % C2 (ethylene-based units).

In an embodiment, the polypropylenes comprise between 3 wt. % and 50 wt. % of at least one anhydride grafted polypropylene (pp-g-AH) based on the weight of the polypropylenes, such as between 5 wt. % and 50 wt. %. This anhydride-containing polymer acts as a compatibilizer between the polypropylenes on the one hand and the polyamides and/or ethylene vinyl alcohol on the other hand. In an embodiment, said anhydride grafted polypropylene is selected from the group consisting of: i) maleic anhydride grafted polypropylene homopolymer (PP-g-MAH); ii) maleic anhydride grafted polypropylene copolymer (co-PP-g-MAH); iii) maleic anhydride grafted propylene-α-olefin elastomer (EPM-g-MAH); iv) maleic anhydride grafted poly [styrene-b-(ethene-co-butene-1)-b-styrene] (SEBS-g-MAH); v) maleic anhydride grafted ethylene propylene diene monomer rubber (EPDM-g-MAH).

In a specific embodiment, the anhydride-grafted polypropylene comprises a low anhydride content (LAC) anhydride-grafted polypropylene comprising between 0.1-0.5 wt. % of grafted maleic anhydride, based on the weight of the anhydride-grafted polypropylene. In a specific embodiment, the anhydride-grafted polypropylene used to prepare the polymer composition comprises a high anhydride content (HAC) anhydride-grafted polypropylene comprising >0.8 wt. % of grafted maleic anhydride, based on the weight of the anhydride-grafted polypropylene.

In a preferred embodiment, the anhydride-grafted polypropylene used to prepare the polymer composition comprises a mixture of LAC anhydride-grafted isotactic polypropylene and HAC anhydride-grafted isotactic polypropylene. In an embodiment, the total anhydride content in the recipe used to prepare the polymer composition is between 0.04 and 0.4 wt. %, preferably between 0.08 and 0.3 wt. %, more preferably between 0.1 and 0.2 wt. % based on the combined weight of the polypropylenes In an embodiment, the polypropylenes comprise between 25 and 50 wt. % of at least one polypropylene homopolymer, between 25 and 65 wt. % of at least one polypropylene copolymer, and between 3 and 45 wt. % of at least one anhydride-grafted polypropylene based on the weight of the polypropylenes, preferably said at least one polypropylene homopolymer, said at least one polypropylene copolymer and said at least one anhydride-grafted polypropylene combined forming 100 wt. % of said polypropylenes.

In an embodiment, the polypropylenes of the polymer composition comprise at least one homopolymer of propylene, at least one copolymer of propylene and at least one anhydride-grafted polypropylene; said polymer composition further has a melt flow rate measured according to ASTM D1238-13 at 230° C./2.16 kg that is lower than 20 g/10 min, preferably lower than 15 g/10 min, more preferably lower than 12 g/10 min, and further the temperature exothermic crystallisation peak ($T_{pc}$) of the differential scanning calorimetry at a cooling rate of 20 K/minute is lower than 115° C., preferably lower than 110° C., more preferably lower than 108° C. wherein the sum of these polypropylenes accounts for 100% of the combined weight of the polypropylenes.

In an embodiment, the composition has a melt flow rate of less than 10 g/10 min, measured according to ISO 1133:1-2011 (230° C., 2.16 kg). In an embodiment, the composition after five rounds of extrusion on a Collin Teach-Line ZK25T co-rotating twin screw lab extruder with one kneading section operated at 210 rpm with an output of 0.5 kg/hour, using a temperature profile beginning at a temperature of 190° C. at zone 1 increased to a temperature of 210° C. at zone 5, keeping the temperature in the polymer melt between 215 and 220° C., has a melt flow rate of less than 10 g/10 min, measured according to ISO 1133:1-2011 (230° C., 2.16 kg).

In a specific embodiment, the amount of polyamides in the mixture of polyamides/ethylene vinyl alcohols is 0-40 wt. % based on the combined weight of polyamides and ethylene vinyl alcohols.

The composition may further comprise one or more additive to further increase the balance between stiffness and impact strength, preferably said additives are selected from the group consisting of the following or one or more combinations thereof:
nucleating agents:
α-crystal phase nucleating agents including
inorganic agent such as talc, mica and wollastonite;
organic agents such as particulate nucleating agents like benzoates, organophosphates;
soluble nucleating agents like sorbitols and trisamides;
β-crystal phase nucleating agents such as γ-quinacridone, calcium pimelate or suberate, certain types of pigments, N,N-dicyclohexyl-2,6-naphthalene dicarboxamide;
A toughener, selected from the group consisting of maleic anhydride grafted thermoplastic elastomers such as styrene ethylene butylene styrene grafted with maleic anhydride (SEBS-g-MA), ethylene propylene diene monomer grafted with maleic anhydride (EPDM-g-MA)], poly(octene-ethylene) rubber grafted with maleic anhydride (POE-g-MA). It should be noted that the first two tougheners are also active as compatibilizers.
a reinforcement filler such as carbon fibers or glass fibers or other inorganic fillers, preferably in an amount of 15-50 parts per hundred parts resin (phr).

In an embodiment, the composition comprises at least one nucleating agent, at least one toughener and at least one reinforcement filler.

It is possible to prepare polymer composition comprising between 30 and 50 wt. % of polyamides and/or ethylene vinyl alcohols, and between 70 and 50 wt. % of polypropylenes, based on the combined weight of polyamides and/or ethylene vinyl alcohols and polypropylenes, which are not according to the invention with respect to the DSC characteristics. In other words, there are polymer compositions that comply with the weight ranges of the claims but do not comply with the thermal characteristics. In order to provide the benefits of the present invention, the polymer compositions must comply both with the claimed weight ranges as well as with the claimed thermal characteristics. The present inventors has surprisingly found that the combination of these weight ranges and thermal properties lead to polymer compositions having optimal properties. These thermal characteristics depend on several properties of the polymer compositions, such as number of different polymers used, type of polymers used, and amount of polymers used and these interact with each other. This is also shown in the Examples where a comparative example is disclosed complying with the claimed weight ranges but not the thermal characteristics.

A person skilled in the art can adjust the composition in various ways to obtain a polymer composition according to the present invention complying with the thermal characteristics, as exemplified in the following paragraphs.

When a lower peak temperature of the tallest DSC crystallisation exotherm ($T_{pc}$) for the polymer composition is desired, a polypropylene and/or polyamide with a lower $T_{pc}$ can be used as a starting material. And vice versa: to obtain a polymer composition with a higher $T_{pc}$, a polypropylene and/or polyamide with a higher $T_{pc}$ can be used as a starting material.

Another way (used instead of or besides the above way) to decrease the $T_{pc}$ for the polymer composition is to increase the number of components of the polymer composition, e.g. from ternary to quaternary or quinary e.g. by adding additional polypropylene(s), such as copolymer or anhydride-grafted polypropylene. By using a composition having an increased number of polymer components, the molecule entanglement between different polymers is increased; this was found by the present invention to delay crystallization, and increase resiliency of the polymer against chain session during mechanical recycling.

Another way (used instead of or besides the above ways) to decrease the $T_{pc}$ for the polymer composition is the use of a higher amount of polyamide provided that it is well compatibilized with polypropylene(s). Another way (used instead of or besides the above way) to increase the $T_{pc}$ for the polymer composition is the use of a lower amount of polyamide.

In addition, the rheology of both phases could be brought into line, for example by having both a high viscosity polypropylene with a high viscosity polyamide. This "rheology matching" will improve the miscibility of the dispersed phase. With "rheology matching" in this context is meant to select materials whose rheology curves have similar elasticity. Rheology curves are the plots of viscosities versus shear rates.

The viscosity of the polyamide also influences the thermal characteristics of the polymer composition when a anhydride-grafted polypropylene is used. Amine end-groups (present in a polyamide) are required to react with maleic anhydride. A skilled person might believe that it is advantage to use a lower viscosity PA having more amine end groups. And according to common practise, to achieve good blending effect, polymer in dispersed phase should have much lower viscosity compared with that in continuous (matrix) phase. However, the present inventor has found that higher viscosity polyamide (e.g. PA6) can contribute to the delayed crystallization of the present polymer alloy, thanks to its lower $T_{pc}$ than lower viscosity polyamide. The lower amount of amine end group that are present in high viscosity polyamide will not pose a problem; water is released upon imide link formation which water can lead to further hydrolysis of PA, which will produce sequentially more amine end groups. In addition, when compatibilizer is present, the common practise of polymer blends becomes less relevant. It is more important to let the dispersed and the continuous phases have good rheology match to maximize the chance of imide link formation.

Generally the peak temperature of the tallest DSC crystallisation exotherm ($T_{pc}$) measured at a cooling rate of 20 K/minute is not less than 85° C.; this is known to a skilled person.

In case the area under the curve of the tallest DSC crystallization exotherm is less than 80% of the total area under the curve between a temperature of 200° C. and 50° C. a skilled person should consider increasing the compatibilisation of the two phases, for example by adding (more) compatibilizer or improving the rheology matching for the two phases.

In case the temperature difference ($T_{m1}$-$T_{pc}$) between the peak temperature in DSC of the first melting endotherm ($T_{m1}$) measured at the heating rate of 20 K/minute and the peak temperature of the tallest DSC crystallisation exotherm ($T_{pc}$) measured at a cooling rate of 20 K/minute is less than 45° C. a this might lead to an alloy that is more sensitive to certain processing conditions such as blowing and stretching, because the crystallization could disturb the forming of shapes A skilled person could consider decrease the $T_{pc}$ as discussed above.

Differential Scanning calorimetry (DSC) measures the temperatures and heat flows associated with transitions in materials as function of time and temperature. Such DSC characteristics can be measured on various DCS instruments. These instruments are for example available from NETZSCH or TA Instruments. An example of a NETZSCH DSC instrument is the NETZSCH DSC 214 Polyma®. Examples of DSC instruments from TA Instruments are DSC 2910 and Q2000.

In an embodiment of the present invention in all aspects, the DSC characteristics of the composition according to the present invention are measured with a NETZSCH DSC 214 Polyma®.

In a first variant of the second aspect, the invention relates to a method of preparing the composition, the method comprising reactively blending multiple virgin polymers by means of extrusion. This is a first embodiment of the method, wherein virgin polymers are used to prepare the composition (alloy). In a second variant of the second aspect, the invention relates to a method of preparing the composition, the method comprising recycling particles of a polymer composition according to any of the preceding claims by means of extrusion. In a third aspect, the invention relates to an article comprising the composition of the first aspect. In a fourth aspect, the invention relates to a method to prepare the article according to the third aspect, the method comprising 3D printing, film and sheet extrusion, tube and profile extrusion, extrusion blow moulding, injection blow moulding, stretch blown moulding, thermoforming, injection moulding, fibre spinning and extrusion coating.

In an embodiment, the method to prepare a composition according to the invention comprises the step of recycling plastic particles whose virgin version contains one of the above stated compositions. The plastic particles are typically extruded two dimensional particles such as fibres, filaments, films, sheets and nonwovens; three dimensional particles such as profiles, containers, and structural parts.

In an embodiment, the method to prepare a composition according to the invention comprises the step of providing at least one virgin polypropylene or recycled polypropylene and at least one virgin polyamide or ethylene vinyl alcohol or recycled polyamide or ethylene vinyl alcohol and mixing these to form the composition of the invention. In an embodiment, at least one polypropylene and at least one polyamide and/or ethylene vinyl alcohol are present in a multilayer article such as films, tubes, hybrid fibres or fabrics that is recycled to form both the recycled polypropylene as well as the recycled polyamide and/or ethylene vinyl alcohol. In an embodiment, the polymer composition may be obtained by the recycling of one or more multilayer articles comprising at least one polypropylene and at least one polyamide and/or ethylene vinyl alcohol.

In an embodiment, the polymer composition may be obtained fully from virgin polymers. With obtained fully from virgin polymers means that the virgin polymers and additives sum up to 100 wt. %.

In an embodiment, the polymer composition may be obtained by a mixture of virgin and recycled polymers.

In case a recycled polymer is used in the polymer composition according to the present invention, one or more anhydride grafted polypropylene may be added. This can be done to further improve compatibilization, e.g. in the case where the mixing is not optimal. For example, an amount of 3-5 wt. % of an anhydride grafted polypropylene may be added, preferably a HAC. However, when the recycled polymer already comprises anhydride grafted polypropylenes, it may not be needed to add more.

In an embodiment of the article according to the invention, the article is an extruded article. This extruded article can for instance be obtained by 3D printing, film and sheet extrusion, tube and profile extrusion, extrusion blow moulding, injection blow moulding, stretch blown moulding, thermoforming, injection moulding, fibre spinning and extrusion coating Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope thereof.

The scope of the present invention is defined by the appended claims. One or more of the objects of the invention are achieved by the appended claims.

Materials and Methods

Differential Scanning Calorimetry

The differential scanning calorimetry test is conducted under a nitrogen atmosphere using. Polymers for testing were first dried in a vacuum oven at 80° C. for 24 hours. A slice (weight of between 8-10 mg) of a polymer granule was cut as the test specimen. Each test specimen was heated from −40° C. to 300° C. at a heating rate of 20 K/minute (first heating scan) in order to remove the thermal history. The sample was then held for 5 minutes under at the temperature of 300° C., then cooled from 300° C. at 20 K/minute to −40° C. (cooling scan). The sample was then held for 5 min under temperature of −40° C. Afterwards the sample was heated again from −40° C. to 300° C. at a heating rate of 20 k/min (second heating scan)

This procedure is in conformity with ASTM D3418-03 except that a heating and cooling rate are set at 20 Kelvin/minute instead of at 10 Kelvin/minute to determine the peak temperature of crystallization exotherm ($T_{pc}$). Measuring with a heating and cooling rate of 20 Kelvin/minute was found by the inventor to be more sensitive to determine the difference in delayed crystallization while still keep the sufficiently good level of repeatability. The measurements may also be carried out according to ASTM D3418-03 at heating and cooling rates at 10 K/min.

The isothermal differential scanning calorimetry test is conducted under a nitrogen atmosphere. Polymers for testing were first dried in a vacuum oven at 80° C. for 24 hours. A slice (weight of between 6-8 mg) of a polymer granule was cut as the test specimen. Each test specimen was heated from 20° C. to 230° C. at a heating rate of 500 K/minute. The test sample was held for 5 minutes at 230° C. to remove the anisotropy of molecular orientation, then cooled at 65 K/minute to the targeted temperature (e.g. 118° C./120° C./124° C.) and kept at the targeted temperature for a sufficiently long period of time, viz. 20 minutes, to allow the formation of nucleation sites, and then the completion polymer crystallization at those sites.

The differential scanning calorimetry measurements were performed on a NETZSCH DSC 214 Polyma®.

Melt flow rate (MFR), if not specifically specified, was measured according to ISO 1133:1-2011 (230° C., 2.16 kg).

Materials

The metallocene-catalysed polypropylene homopolymer used in the examples has an melt flow rate of 10 g/10 min, $T_m$ of 160.5° C. and $T_{pc}$ of 98.7° C. ($T_m$-$T_{pc}$=61.8° C.).

The Ziegler/Natta—catalyzed polypropylene homopolymer used in the examples has an melt flow rate of 10 g/10 min, $T_m$ of 167.5° C. and $T_{pc}$ of 107.5° C. ($T_m$-$T_{pc}$=60° C.).

The polypropylene random copolymer used in the examples has an melt flow rate of 7 g/10 min, $T_m$ of 137.9° C. and $T_{pc}$ of 94.1° C. ($T_m$-$T_{pc}$=43.8° C.); and an ethylene concentration of 5 wt. %.

The low anhydride concentrated (LAC) maleic anhydride-grafted isotactic polypropylene used in the examples has an melt flow rate of 5 g/10 min, $T_m$ of 150.8° C. and $T_{pc}$ of 100.9° C. ($T_m$-$T_{pc}$=49.9° C.). The grafted maleic anhydride content is 0.2 wt. %

The high anhydride concentrated (HAC) maleic anhydride-grafted isotactic polypropylene used in the examples has an melt flow rate of 120 g/10 min at 170° C. 1.2 kg. The grafted maleic anhydride content is 1.0 wt. %.

The ethylene vinyl alcohol used in the examples has an melt flow rate of 7 g/10 min, $T_m$ of 174.2° C. and $T_{pc}$ of 140.0° C. ($T_m$-$T_{pc}$=34.0° C.). This ethylene vinyl alcohol has 32 mol. % ethylene content.

The high viscosity polyamide used in the examples is PA6, and has a $T_m$ of 221.6° C., a $T_{pc}$ of 160.9° C. ($T_m$-$T_{pc}$=60.7° C.), and has a relative solution viscosity (RSV) of 3.2 measured in 90% formic acid.

The medium viscosity polyamide used in the examples is PA6, and and has a $T_m$ of 222.1° C., a $T_{pc}$ of 172.5° C. ($T_m$-$T_{pc}$=49.5° C.), and has a relative solution viscosity (RSV) of 2.3 measured in 90% formic acid.

The films in the examples have two types: type (i) a multilayer coextruded transparent film substrate prepared according to the example substrate film (SF 1a) in European patent application EP18185113.0 filed on Jul. 24, 2018 (priority date of Jul. 24, 2017), but the layers using random propylene copolymer is replaced by the polypropylene homopolymer; type (ii) a printed and laminated multi-layer film assembly prepared according to the example multi-layer assembly (MLA 1) in European patent application EP18185113.0 filed on Jul. 24, 2018 (priority date of Jul. 24, 2017).

Composition Preparing

Unless specified, polymer compositions made from virgin polymers are prepared by reactive compounding using Coperion ZSK Mc$^{18}$ twin screw extruder. The extruder is equipped with general purpose corotating tween screw with two kneading sections Polymers are first dry blended according to the recipes then extruded at a mild ascending temperature profile began at 190° C. at zone 1 and gradually increased to 210° C. at zone 9. The processing parameters are then fine-tuned to keep measured temperature in the melt at between 235° C. and 255° C. The extruder runs at 500 rpm with the output of 4 kg/hour.

Polymer compositions made from recycled polymer films are prepared by reactive compounding using Coperion ZSK Mc$^{18}$ twin screw extruder. Films are first shredded and agglomerated to reduce the air included in the bulk. The agglomerated particles are then dry blended with 5 phr of high anhydride concentrated (HAC) anhydride-grafted isotactic polypropylene to make its material composition identical to that of virgin blends. The blend is then extruded at a mild ascending temperature profile began at 170° C. at zone 1 and gradually increased to 190° C. at zone 9. The processing parameters are fine-tuned to keep temperature in the melt at between 235° C. and 255° C. The extruder runs at 500 rpm with the output of 4 kg/hour.

Injection Moulding of Tensile Bars

The tensile bar samples are injection molded at Boy 35$^E$ at 240° C., 100 mm/s injection speed, 75 bar front and back pressure and a mold temperature of 55° C. Mechanical properties (tensile tests) are assessed by injection molding the samples into tensile bars, then measured at Zwick tensile tester according to the standard ISO 527-1:2012. The following features have been tested: yield strength ($\sigma_{Yield}$), tensile modulus ($E_t$), and elongation at break ($\varepsilon_{break}$).

Extruding 3D Printing Filaments

FDM 3D printing monofilaments are extruded at a Collin Teach-Line ZK25T twin screw lab extruder. The extrusion temperature is set at 230° C. with the extrusion speed of 30 rpm. The processing parameters are then fine-tuned to keep temperature in the melt at 240° C. After extrusion, the filament was cooled in water with a temperature of 50° C.

EXAMPLES

The present invention is further elucidated based on the Examples below which are illustrative only and not considered limiting to the present invention.

Example 1—Alloy Formation; Crystallization and Tensile Tests

Three types of recipes are prepared to evaluate (i) the processing window of extruding the compositions into articles, which is indicated by crystallization kinetics in differential scanning calorimetry; (ii) the repeatability of mechanical properties of processed articles, which is indicated by the standard deviation of elongation at break of injection moulded tensile bars; (iii) the performance tolerance of the composition to the variation in material recipes as well as in the source of feedstocks (virgin versus recycled), which is assessed with overall crystallization and mechanical performance.

Recipes A (Seven Samples)

The first, matrix phase (polypropylenes) comprises a polypropylene homopolymer, a polypropylene random copolymer, a low anhydride concentrated (LAC) maleic anhydride-grafted isotactic polypropylene and a high anhydride concentrated (HAC) maleic anhydride-grafted isotactic polypropylene (four types of polypropylenes). The second, disperse phase comprises a high viscosity polyamide 6 and/or an ethylene vinyl alcohol. Seven samples are prepared. Sample A1 is recycled from scraps of a multilayer film assembly type (ii). Samples A2, A3 and A4 are made from virgin polymers, wherein the EvOH content varies. Samples A5, A6 and A7 are made from virgin polymers. In A5-A7, the homo polypropylene is Ziegler/Natta catalyzed, and the sample differ in the amounts of the different types of polypropylenes used. A5-A7 do not comprise EvOH, only polyamide.

Recipes B (Four Samples)

The first, matrix phase (polypropylenes) comprises a polypropylene homopolymer, a low anhydride concentrated (LAC) maleic anhydride-grafted isotactic polypropylene and a high anhydride concentrated (HAC) maleic anhydride-grafted isotactic polypropylene (three types of polypropylenes). The matrix phase of recipe B doesn't comprise polypropylene random copolymer. The second, disperse phase comprises a high viscosity polyamide 6 and/or an ethylene vinyl alcohol. Four samples are prepared. Sample B1 is recycled from scraps of a polymer single film type (i). B2 is reprocessed from the scraps of B1 as well as from the 3D printing filaments made from B1. B2 is used to assess the feasibility of multiple rounds of recycling. Samples B3 and B4 are made from virgin polymers, wherein the disperse phase of B3 contains PA6 and EvOH; that of B4 contains only PA6.

TABLE 1

Composition of the examples

| | | | Polypropylene | | | | EvOH + PA | |
|---|---|---|---|---|---|---|---|---|
| | | | Homopolymer | Random | LAC | HAC | EvOH | PA6 |
| # | Source | Catalyst | wt. %[1] (wt. %[2]) | wt. %[1] (wt. %[2]) | wt. %[1] (wt. %[2]) | wt. %[1] (wt. %[2]) | wt. %[3] (wt. %[2]) | wt. %[3] (wt. %[2]) |
| A1 | Printed laminates | M | 28.57 (17.14) | 28.57 (17.14) | 34.92 (20.95) | 7.94 (4.76) | 35.71 (14.29) | 64.29 (25.71) |
| A2 | Virgin polymer | M | 28.57 (17.14) | 28.57 (17.14) | 34.92 (20.95) | 7.94 (4.76) | 35.71 (14.29) | 64.29 (25.71) |
| A3 | Virgin polymer | M | 28.57 (17.14) | 28.57 (17.14) | 34.92 (20.95) | 7.94 (4.76) | 19.05 (7.62) | 80.95 (32.38) |
| A4 | Virgin polymer | M | 28.57 (17.14) | 28.57 (17.14) | 34.92 (20.95) | 7.94 (4.76) | n.p. | 100 (40.00) |
| A5 | Virgin polymer | ZN | 28.57 (17.14) | 28.57 (17.14) | 34.53 (21.72) | 7.94 (4.00) | n.p. | 100 (40.00) |
| A6 | Virgin polymer | ZN | 30.00 (12.14) | 16.00 (12.14) | 44.00 (20.72) | 10.00 (5.00) | n.p. | 100 (50.00) |
| A7 | Virgin polymer | ZN | 38.78 (27.14) | 24.49 (17.14) | 29.93 (22.72) | 6.80 (3.00) | n.p. | 100 (30.00) |
| B1 | Transparent film | M | 57.14 (34.29) | n.p. | 34.92 (20.95) | 7.94 (4.76) | 35.71 (14.29) | 64.29 (25.71) |
| B2 | B1 scraps | M | 57.14 (34.29) | n.p. | 34.92 (20.95) | 7.94 (4.76) | 35.71 (14.29) | 64.29 (25.71) |
| B3 | Virgin polymer | M | 57.14 (34.29) | n.p. | 34.92 (20.95) | 7.94 (4.76) | 35.71 (14.29) | 64.29 (25.71) |
| B4 | Virgin polymer | M | 57.14 (34.29) | n.p. | 34.92 (20.95) | 7.94 (4.76) | n.p. | 100 (40.00) |
| C1 | Virgin polymer | M | 92.06 (55.24) | n.p. | n.p. | 7.94 (4.76) | n.p. | 100 (40.00) |
| C2 | Virgin polymer | ZN | 95.70 (67.00) | n.p. | n.p. | 4.23 (3.00) | n.p. | 100 (30.00) | n.p = not present
[1] wt % is based on the weight of polypropylenes
[2] wt % is based on the weight of the total composition
[3] wt % is based on the weight of polyamide and/or ethylene vinyl alcohols

Recipes C (Two Samples)

The first, matrix phase (polypropylenes) comprises a polypropylene homopolymer and a high anhydride concentrated (HAC) anhydride-grafted isotactic polypropylene (two types of polypropylenes). The second, disperse phase comprises a polyamide 6. Although the selection of the materials as well as the concentration of the dispersed phase are not the obvious solution for a person skilled in the art, a blend of two immiscible polymers together with a compatibilizer—as Recipe C is—is a common practice. Therefore Recipe C can partially serve as an comparison example. Detailed material recipe is listed in table 1. Sample C1 comprises a metallocene catalysed homopolymer, whereas sample C2 comprises a Ziegler-Natty catalysed homopolymer. Sample C2 comprises a medium RSV polyamide 6.

The results, shown below in Table 2 show that $T_{pc}$ of all examples except for comparative C2 are lower than 108° C. with most of them (except B2 and B3) even lower than 105° C. The alloys with metallocene-catalysed polypropylene according to recipe A (A1-A4) have the lowest values for $T_{pc}$, viz. between 100.2° C. and 103.1° C., compared to between 102.9° C. and 107.2° C.

It can also be observed that when comparing the same recipes for virgin and recycled films, the lowest $T_{pc}$ is obtained by materials made from film scraps. For example, when comparing A1 (recycled) having a value of 101.4° C. to A2 (virgin) having a value of 103.1° C. or when comparing B1 (recycled) or B2 (recycled from B1) having respective values of 102.9° C. and 105.6° C. to B3 (virgin) having a value of 107.2° C. Without wishing to be bound by a particular theory, the inventor believes that this is due to fact that during film production the reaction between layer of different materials is much more controlled than during the blending of virgin materials.

Regarding $T_{m1}-T_{pc}$, it can be observed that all samples have the value of >45° C., all examples have a value of over 47° C., most examples (except B2) have a value of over 49° C. and most examples (except B2 and B3) have a value over 50° C. Sample C also has high $T_m-T_{pc}$ value, but it is mainly due to the fact that $T_m$ of sample C is the highest.

It can also be observed that when comparing the same recipes for virgin and recycled films, the highest value for $T_{m1}-T_{pc}$ is obtained by materials made from film scraps. For example, when comparing A1 (recycled) having a value of 54.4° C. to A2 (virgin) having a value of 50.3° C. or when comparing B1 (recycled) having a value of 56.1° C. to B3 (virgin) having a value of 49.6° C. Without wishing to be bound by a particular theory, the inventor believes that this is due to fact that during film production the reaction between layer of different materials is much more controlled than during the blending of virgin materials.

It can be concluded from these results that all samples have delayed crystallization compared with conventional PP/PA plastic alloys whose $T_{pc}$ are above 115° C. and very often above 120° C. and in addition have $T_{m1}-T_{pc}$ values that are often below 45° C.

TABLE 2 results for $T_{m1}$, $T_{pc}$ and $T_{m1} - T_{pc}$ for the examples.

| # | $T_{m1}$ | $T_{pc}$ | $T_{m1} - T_{pc}$ | AUC (in %) |
|---|---|---|---|---|
| A1 | 155.8 | 101.4 | 54.4 | 100 |
| A2 | 153.4 | 103.1 | 50.3 | 85 |
| A3 | 153.1 | 102.1 | 51 | 94 |
| A4 | 154.7 | 100.2 | 54.5 | 95 |
| A5 | 160.2 | 107.7 | 52.5 | 89 |
| A6 | 160 | 107 | 53 | 82 |
| A7 | 161.2 | 109.4 | 51.8 | 98 |
| B1 | 159 | 102.9 | 56.1 | 93 |

TABLE 2-continued results for $T_{m1}$, $T_{pc}$ and $T_{m1} - T_{pc}$ for the examples.

| # | $T_{m1}$ | $T_{pc}$ | $T_{m1} - T_{pc}$ | AUC (in %) |
|---|---|---|---|---|
| B2 | 153.3 | 105.6 | 47.7 | 99 |
| B3 | 156.8 | 107.2 | 49.6 | 86 |
| B4 | 157.1 | 104.7 | 52.4 | 97 |
| C1 | 159.5 | 104.7 | 54.8 | 97 |
| C2 | 165.1 | 111.6 | 53.5 | 100 |

It is shown by sample C2 in Table 2 that even when a composition comprising between 30 and 50 wt. % of polyamides and/or ethylene vinyl alcohols, and between 70 and 50 wt. % of polypropylenes, based on the combined weight of polyamides and/or ethylene vinyl alcohols and polypropylenes, is not necessarily according to the invention with respect to the DSC characteristics: the $T_{pc}$ of sample C2 is 111.6.

An isothermal differential scanning calorimetry is conducted at temperatures of 120° C. and 124° C. to give the direct evidence of delayed crystallization effect. Here the comparison is done between recipe A (A1 and A4) and C1, because the $T_{pc}$ of sample C1 is on average 4° C. higher than samples of recipe A (104.7° C. versus values of 101.4° C. and 100.2° C.). The results are shown in Table 3.

TABLE 3 results of isothermal DSC.

| Temp. | Example no. | A4 | A1 | C1 |
|---|---|---|---|---|
| 120° C. | mw/mg | 0.31 | 0.38 | 1.0 |
|  | $T_{0.5}$ (min) | 1.1 | 0.9 | 0.5 |
| 124° C. | mw/mg | N.D. | N.D. | 0.5 |
|  | $T_{0.5}$ (min) | N.D. | N.D. | 1.7 |

At 124° C., the crystallization of sample A1 and A4 is not detectable (peak heat flow lower than 0.1 mw/mg per 0.001 minute), while for sample C1 it already crystalizes fairly fast (about 1.7 minutes to reach peak crystallization exotherm).

At 120° C., the crystallization of sample A1 and A4 is detectable (peak heat flow of 0.31 and 0.38 mw/mg per 0.001 minute, it takes 1.1 and 0.9 minutes to reach peak crystallization exotherm), while it takes sample C1 has a peak heat flow of 1.0 mw/mg per 0.001 minute and it takes 0.5 minutes to reach peak crystallization exotherm.

Therefore, samples from recipe A show better processing for plastic extrusion applications compared to sample C1.

In order to further verify the impact of polymer composition on delayed crystallization, the isothermal differential scanning calorimetry at temperature of 120° C. is conducted with sample A5, A6, A7 and C2. All samples A5, A6, A7, and C2 are composed of Ziegler/Natta polypropylenes, so the effect of low $T_{pc}$ from metallocene polypropylene is excluded. However, the peak flow of quaternary or quinary blends from Sample A5, A6, A7 are still significantly lower than Sample C1 and C2. When looking into the PP/PA ratio, samples with higher PA ratio (A5, A6, C1) have lower peak heat flow than their lower PA ratio counter parts.

TABLE 4 results of isothermal DSC.

| Temp. | Peak | A5 | A6 | A7 | C1 | C2 |
|---|---|---|---|---|---|---|
| PP/PA | | 60/40 | 70/30 | 50/50 | 70/30 | 70/30 |
| 120° C. | mw/mg | 0.52 | 0.30 | 0.65 | 1.00 | 1.10 |

Tensile tests have been carried out on the Examples using metallocene catalyzed polypropylenes. The results are shown in Table 4. The value for a polypropylene homopolymer for the yield strength ($\sigma_{Yield}$) is generally between 25 and 35 MPa. The value for a polypropylene homopolymer for the tensile modulus ($E_t$) is generally in the range of 1350 MPa to 1700 MPa. The value for a polypropylene homopolymer for the elongation at break ($\varepsilon_{break}$) is generally above 500% and for a commercial alloy above 50%.

From Table 5 it is clear that all samples have the yield strength and young modulus at the average or above average level of polypropylene homopolymers.

TABLE 5

Results for tensile tests.

| # | $E_t$ (MPa) | $\sigma_{Yield}$ (MPa) | $\sigma_{Break}$ (MPa) | $\varepsilon_{Break}$ (%) | $\varepsilon_{Break}$ st. dev. % |
|---|---|---|---|---|---|
| A1 | 1349 | 25.9 | 17.8 | 43.9  | 5.4  |
| A2 | 1578 | 28.9 | 27.1 | 261.0 | 26.2 |
| A3 | 1565 | 28.3 | 26.3 | 243.6 | 29.4 |
| A4 | 1426 | 27.8 | 24.7 | 197.9 | 24.6 |
| B1 | 1576 | 30.1 | 21.4 | 150.6 | 79.4 |
| B2 | 1647 | 29.2 | 18.7 | 94.2  | 16.4 |
| B3 | 1709 | 30.1 | 25.1 | 196.1 | 16.4 |
| B4 | 1633 | 30.5 | 24.6 | 142.4 | 20.3 |
| C1 | 1918 | 33.0 | 26.9 | 147.0 | 80.9 |

Table 5 shows the standard deviation of elongation at break; the higher the value the lower the homogeneity of the alloys. This provides information regarding the repeatability of material performance. Sample C1 shows the highest standard deviation, which confirms the difficulties of making high PA concentrated PP/PA alloy via ternary blends and clearly shows the advantages of recipes A and B.

It should be noted that sample B1 has a high standard deviation of elongation at break. The present inventor believes that this is caused by a non-optimal blending during the reactive blending extrusion. This is due to the fact that the film particles are more difficult to blend than polymer granules. This was confirmed by Sample B2 which was the reprocessed Sample B1 scrap. Here the standard deviation is back to the normal level. When comparing the results from samples B1 and B2, it can be observed that there is no significant decline in the tensile strength and tensile modulus, suggesting the feasibility to do multiple rounds of recycling with the alloys according to the invention.

The above clearly shows that the compositions according to the present invention have a broad processing window due to delayed crystallization. It can be concluded that the compositions according to the invention have a good tolerance to the variation in material compositions and feedstocks. Hence, one or more objects of the present invention are achieved.

Example 2. Fused Deposition Modelling (FDM 3D Printing)

FDM 3D printing was used to test the compositions according to the present invention. This technique is perhaps the most demanding plastic extrusion process for semi-crystalline engineering plastics and provides good insight into the processability of the compositions according to the invention.

In FDM 3D printing, a semi-crystalline material could crystalize at a wide temperature range from the melt till room temperature, because the temperature during printing cannot be precisely controlled. If a material performs well in FDM 3D printing, there will be a high probability that it will also perform well in other plastic extrusion process.

Polypropylenes, although known as easy processable semi-crystalline materials for conventional plastic particle extrusion processes, are not widely applied yet in FDM 3D printing. When the material temperature during printing is above 120° C., polypropylene crystalizes very slowly and therefore easy to process. When printing polypropylenes a temperature of 120° C. is too high for the material to maintain the 3D printed form/shape. When the material temperature is lower than e.g. 110° C., the material is able to maintain its printed form/shape; however the crystallization rate accelerates significantly with each degree of temperature reduction. The significant variance in crystallization rate results in shrinkage difference between each printed layer of a form/shape leading to high stress between the different layers in a printed article. Consequently, significant warping is observed in these articles, which is the result of the stress between the layers. In addition, poor layer adhesion is observed.

The objective of example 2 is to assess if the compositions according to the present invention show decreased warpage compared to polypropylene during FDM 3D Printing.

Samples A1 and B2 are processed to produce FDM 3D printing monofilaments with a diameter of 1.75 mm. These monofilaments are tested at of HMS434 and Ultimaker s5 3D printers which allows the setting of the print bed temperature up to a temperature of 140° C. The article to be printed is a tensile bar according to ISO 527-1:2012 with the dimension of 170 mm (l)×20 mm (w)×4 mm (h).

The 3D printing experiment is conducted with two values for the print bed temperature, viz. 110° C. and 120° C. The temperature of the printer head is set at a temperature of 230° C. for the first layer is and at 220° C. for the remaining layers. The printing speed is 35 mm/second for the first layer, and 55 mm/second for the remaining layers. The set filling rate is 98%; the set layer thickness is 200 micron. In order to improve the adhesion of the printed article to printing bed, a brim of 10 mm wide is printed around the article. During the printing, no tape or adhesion enhancing coating was used between the printing bed and the printed article. The printing head moves in the x-direction and y-direction of the tensile bar with a cross angle of 90 degrees.

With a set temperature of the printing bed of 100° C., the printed article showed a slight degree of warpage; the angle between the tangent plane of the article and the printing bed being between 5 and 10 degrees. With a set temperature of the printing bed of 120° C., the printed article showed no warpage and showed excellent maintaining of the printed form/shape. Moreover, a shrinkage of less than 1% in all dimensions was observed. This clearly shows that the compositions according to the present invention show better performance on 3D printing than polypropylenes.

The mechanical properties of these 3D printed parts were tested as a proof of principle. The first results show that these articles printed at HMS434 have a very similar yield stress and tensile modulus to the injection moulded test specimens discussed above. This is a surprising result because normally FDM 3D printed articles only reach 50-70% of the strength of its injection moulded counterpart. This result shows, without wishing to be bound to a particular theory, that with the compositions according to the present invention there is a clear improvement in layer adhesion. Moreover, the 3D printed article has the comparable level of crystallinity compared with injection moulded article.

This example clearly shows the effects of the composition according to the present invention. Not only does the delayed crystallization allow the composition to stay highly amorphous during 3D printing and crystalize after the printing in complete, hence solving the warpage problem. Moreover, the high amount of polyamide and EvOH in the compositions according to the invention allows the composition to maintain the 3D printed form/shape when printed at high printing bed temperature. Hence, one or more objects of the present invention are achieved.

Example 3. Mechanical Recycling

The mechanical recycling experiment were conducted using a Collin Teach-Line ZK25T lab extruder. The extruder was equipped with general purpose co-rotating twin screw with one kneading section. Polymers were extruded at a mild ascending temperature profile beginning at a temperature of 190° C. at zone 1 and were gradually increased to a temperature of 210° C. at zone 5. The measured temperature in the polymer melt during extrusion was kept between 215 and 220° C. to minimize the thermal degradation during recycling. The extruder was operated at 210 rpm with an output of 0.5 kg/hour. Compared with the process for polymer reactive extrusion blending, the polymer recycling used in this example uses a milder temperature profile with milder mixing conditions (lower rpm) in order to minimize polymer degradation. Sample A5 and C2 were selected for use in the recycling test. In addition, the polypropylene homopolymer, a key component to form the matrix phase of A5 and C2, is also tested as a reference. In order to show the effect of the invention, no heat stabilizer and antioxidant are added to the samples for recycling test. The polymers were subjected to five cycles of extrusion using the above cited conditions. After these five cycles the MFR was measured and compared to the MFR prior to these cycles.

TABLE 6

Recycling test

| | MFR g/10 min @230° C., 2.16 kg | |
|---|---|---|
| | Initial | Cycle 5 |
| PP | 9.85 | n.a. |
| A5 | 3.67 | 5.05 |
| C2 | 5.79 | 37.72 |

Results are shown in Table 6. The composition according to the invention (A5) has only a slight increase in MFR (from 3.67 to 5.05 g/10 min) even after five cycles of recycling, whereas the MFR of C2 shows a drastic increase (from 5.79 to 37.72 g/10 min) after recycled five times. The most striking result is the polypropylene, after five cycles of recycling, its MFR is already so high (molecular weight becomes so low) that it is not measurable. Since the tested polypropylene is the key component of the matrix phase of sample A5 and C2, this test clearly shows the effect of the claimed invention in terms of improving material resilience against recurred mechanical recycling.

Sample C2, though its composition falls under the range of the invention, it has a $T_{pc}$ value of above 110° C., and has a heat peak flow of isothermal differential scanning calorimetry at temperature of 120° C. above 1.0 mw/mg, and is thus not according to the invention, and it does not achieve the same level of consistency as sample A5, which is according to the present invention. This consistency in MFR is very crucial to ensure consistent processing of the material, resulting in consistent product quality.

Example 4. Multifilament Spinning and Dyeing

Sample A5 and its recycled version (after five cycles recycling as described in Example 3) were selected for a fiber spinning test. Fiber spinning is one of the most demanding plastic extrusion processes in view of the rheology consistency and one of the most sensitive extrusion processes in view of the crystallization behaviour of polymers. Even a few degrees of difference in $T_m-T_{pc}$ can significantly influence the process stability.

The test was conducted on an old model (1970's) lab scale multifilament spinning line. It has an air cooled quenching followed by two stretching units and one relaxation unit.

The materials are extruded in a single screw extruder having a flat temperature profile with a temperature of 225° C. at zone 1 and zone 2, and a temperature of 230° C. at zone 3. The temperature of the polymer melt in the die is set at a temperature of 215° C. After extrusion, filaments are cooled with air of room temperature. Cooling temperature can only adjusted via changing air flow rate. It is however limited because too high air flow rate will disturb the even space between each filament. The cooled filaments are then guided to two stretching units where they are reheated and gradually stretched to the maximal reachable stretching ratio under stable process.

In addition to sample A5, a commercially obtained fiber grade polypropylene and a commercially obtained medium RSV fiber grade polyamide 6 are also tested as references.

Surprisingly, the recycled sample A5 performs the best. It remained stability even at 3.5 times stretching. The virgin sample A5 (which has not underwent recycling) remained stability at 3.0 times stretching. In contrast, the fiber grade polyamide 6 showed frequent filament tangling and breakage at 3.0 times stretching. The fiber grade polypropylene was found to be the most difficult to spin; it was found very sensitive to air cooling. A small increase in air flow rate was found to disturb the even distance between each filament. A lower air flow rate was found not to be sufficient to cool the spun fiber. Without wishing to be bound by any particular theory, the present inventor believes that the latter is an indication of a very narrow processing window in $T_m-T_{pc}$ for fiber grade PP.

A dyeing test is conducted with the four multi-filament samples. Since polypropylene and sample A5 are hydrophobic, and polyamide is general an easy material for all types of acid dyeing, a dispersed dye is selected. The dyeing solvent is based on poly-naphthalene-sulfonic-acid with a pH value of 4. The color agent (dye) is dispersed in the dyeing solvent with a mixing ratio of 1:20 to the form the dyeing bath. Fiber samples are immersed in the dyeing bath at a temperature of 20° C. for a period of 5 minutes, then gradually heated up at 3° C./min to a temperature of 110° C. and kept at that temperature of 110° C. for a period of 20 minutes, and where afterwards washed with water having a temperature of 30° C.

Polyamide filaments were shown to reach the highest color saturation (visually observed), which was expected because polyamide filaments normally dye easily. Color saturation for the virgin and recycled version of sample A5 were slightly less. The fiber grade polypropylene performed significantly worse.

The virgin and the recycled version of sample A5 were visually shown to have the best quality of color hues, richness, and brightness. The fiber grade polyamide showed less color hues, richness, and brightness. Again, the fiber grade polypropylene performed significantly worse.

Polypropylene has many properties favored by fiber and textile applications, such as low density (light), low moisture absorption (easy to dry), high dimensional stability, good thermal isolation, good mechanical properties, stain and wear resistance. However its application in textile applications is so far still limited due to spinnability and dyeability challenges. Example 4 demonstrates how this invention can solve these challenges. The present invention provides polypropylene compositions which have good properties of polypropylene as well as good spinnability and dyeability of polyamide.

What is claimed is:

1. A polymer composition comprising between 30 and 50 wt. % of polyamides, and between 70 and 50 wt. % of polypropylenes, based on the combined weight of polyamides and/or ethylene vinyl alcohols and polypropylenes;
wherein the polymer composition comprises between 30 wt % and 50 wt % of Nylon 6 as a polyamide based on (i) the combined weight of polyamides and ethylene vinyl alcohols and polypropylenes or (ii) the combined weight of polyamides and polypropylenes;
wherein the polymer composition comprises at least four (co)polymers, the at least four (co)polymers are three polypropylenes and one polyamide or three polypropylenes, one ethyl vinyl alcohol, and one polyamide, wherein two polypropylenes of the three polypropylenes are a first anhydride grafted isotactic polypropylene and a second anhydride grafted isotactic polypropylene, wherein the first and second anhydride grafted isotactic polypropylene vary in grafting concentration relative to one another and a third polypropylene of the three polypropylenes is selected from the group consisting of polypropylene homopolymers, polypropylene based random copolymers, and polypropylene (co)polymer)-based compatibilizers,
wherein the polyamide has a relative viscosity (RSV) of 3.0 or higher measured in 90% formic acid;
wherein the polypropylene forms a first phase having a first melting endotherm (m1) in differential scanning calorimetry (DSC) and wherein the polyamides and/or ethylene vinyl alcohols form a second phase having a second melting endotherm in DSC, wherein the temperature of the first melting endotherm is lower than the temperature of the second temperature melting endotherm;
wherein the tallest DSC crystallization exotherm has an area under the curve of at least 80% of the total area under the curve between a temperature of 200° C. and 50° C.;
wherein the peak temperature of the tallest DSC crystallisation exotherm ($T_{pc}$) measured at a cooling rate of 20 K/minute is between 95° C. and 110° C.;
wherein the temperature difference ($T_{m1}-T_{pc}$) between the peak temperature in DSC of the first melting endotherm ($T_{m1}$) measured at the heating rate of 20 K/minute and the peak temperature of the tallest DSC crystallisation exotherm ($T_{pc}$) measured at a cooling rate of 20 K/minute is at least 45° C.;
wherein the peak heat flow of the isothermal DSC crystallisation exotherm with a cooling rate of 65 Kelvin/minute to reach a temperature of 120° C. is lower than 0.8 mW/mg.

2. The composition according to claim 1, wherein the difference between $T_{m1}$ and $T_{pc}$ is at least 47° C.

3. The composition according to claim 1, wherein the polypropylenes comprise between 84.20 wt. % and 99.96 wt. % of propylene-based units (C3) based on the combined weight of the polypropylenes.

4. The composition according to claim 1, wherein the polypropylenes comprise between 0.00 wt. % and 15.00 wt. % of ethylene-based units (C2) based on the combined weight of the polypropylenes.

5. The composition according to claim 1, wherein the composition has a melt flow rate of less than 10 g/10 min, measured according to ISO 1133:1-2011 (230° C., 2.16 kg).

6. The composition according to claim 1, wherein the composition has a melt flow rate of less than 10 g/10 min, measured according to ISO 1133:1-2011 (230° C., 2.16 kg) after five rounds of extrusion.

7. Article comprising the composition of claim 1.

8. The composition according to claim 1, wherein the peak heat flow of the isothermal DSC crystallisation exotherm with a cooling rate of 65 Kelvin/minute to reach a temperature of 120° C. is lower than 0.5 mW/mg.

9. The composition according to claim 1, wherein the different between $T_{m1}$ and $T_{pc}$ is at least 50° C.

10. The composition according to claim 1, wherein $T_{pc}$ is between 95° C. and 106° C.

11. The composition according to claim 1, wherein the polyamide has a relative solvent viscosity (RSV) of between 3.2 and 3.6.

12. The composition according to claim 1, wherein the first and second anhydride grafted isotactic polypropylene comprise a total anhydride content ranging between 0.04 wt % and 0.4 wt % of a total weight of the three polypropylenes in the polymer composition.

13. The composition of claim 1, wherein the first and second anhydride-grafted isotactic polypropylenes are both anhydride maleic grafted isotactic polypropylenes.

14. The composition of claim 12, wherein the first and second anhydride-grafted isotactic polypropylenes are both anhydride maleic grafted isotactic polypropylenes.

* * * * *